United States Patent
Cormack

(10) Patent No.: US 6,587,608 B2
(45) Date of Patent: Jul. 1, 2003

(54) RECONFIGURABLE, ALL OPTICAL ADD/DROP NODES USING NON-INTERRUPTING SWITCHING APPARATUS AND METHODS

(75) Inventor: Robert H. Cormack, Boulder, CO (US)

(73) Assignee: Chameleon Optics, Inc., Boulder, CO (US)

(*) Notice: Subject to any disclaimer, the term of this patent is extended or adjusted under 35 U.S.C. 154(b) by 72 days.

(21) Appl. No.: 09/844,797

(22) Filed: Apr. 27, 2001

(65) Prior Publication Data

US 2002/0057860 A1 May 16, 2002

Related U.S. Application Data

(60) Provisional application No. 60/248,019, filed on Nov. 14, 2000.

(51) Int. Cl.[7] .................................................. G02B 6/26
(52) U.S. Cl. ........................... 385/16; 385/18; 385/37; 359/117; 359/128
(58) Field of Search .......................... 359/117, 128, 359/129; 385/18, 16, 37

(56) References Cited

U.S. PATENT DOCUMENTS

| | | | |
|---|---|---|---|
| 4,373,782 A | | 2/1983 | Thelen .................. 350/166 |
| 4,516,837 A | * | 5/1985 | Soref et al. .................. 349/196 |
| 4,606,605 A | * | 8/1986 | Ashkin et al. .................. 385/15 |
| 4,626,066 A | * | 12/1986 | Levinson .................. 385/22 |
| 4,756,602 A | | 7/1988 | Southwell et al. .......... 350/166 |
| 4,813,756 A | | 3/1989 | Frenkel et al. ........... 350/96.18 |
| 4,919,503 A | * | 4/1990 | Mroynski .................. 350/96.2 |
| 5,193,027 A | | 3/1993 | Preston .................. 359/566 |
| 5,361,315 A | * | 11/1994 | Lewis et al. .................. 385/16 |
| 5,481,402 A | | 1/1996 | Cheng et al. .................. 359/498 |
| 5,504,608 A | | 4/1996 | Neeves et al. .................. 359/124 |
| 5,606,439 A | * | 2/1997 | Wu .................. 349/117 |
| 5,719,989 A | | 2/1998 | Cushing .................. 359/580 |
| 5,724,165 A | * | 3/1998 | Wu .................. 359/117 |
| 5,777,793 A | | 7/1998 | Little et al. .................. 359/584 |
| 5,812,291 A | | 9/1998 | Bendelli et al. .......... 359/129 |
| 5,822,095 A | * | 10/1998 | Taga et al. .................. 359/127 |
| 5,917,626 A | | 6/1999 | Lee .................. 359/131 |

(List continued on next page.)

FOREIGN PATENT DOCUMENTS

| | | |
|---|---|---|
| CA | 2270768 | 3/1997 |
| JP | 10324037 | 12/1998 |
| WO | 9220002 | * 11/1992 |
| WO | 0039626 | * 7/2000 |

OTHER PUBLICATIONS

PCT Application entitled, "Dynamically Configurable Spectral Filter," by Brophy et al. On behalf of Corning Incorporated, publication No.: WO 01/04674 A1, Publication Date: Jan. 2001, Application No.: PCT/US00/1388, Application Date May 2000.

PCT Application entitled, "Seg,emeted Thin Film Add/Drop Switch and Multiplexer," by Boisset et al. On behalf of Corning Incorporated, Publication No.: WO 01/57570 A1, Publication date: Aug. 2001, Application No.: PCT/US01/03871, Application Date: Jun. 2001.

Patel et al. "Tunable Polarization Diversity Liquid–Crystal Wavelength Filter" IEEE Photonics Technology Letters vol. 3 (8), pp. 739–740, Aug. 1991.

*Primary Examiner*—Hemang Sanghavi
*Assistant Examiner*—Eric Wong
(74) *Attorney, Agent, or Firm*—Jennifer L. Bales; Macheledt Bales LLP

(57) ABSTRACT

Apparatus and methods for switching an optical signal between a first path and a second path, where the switching occurs continuously such that substantially all of the optical signal passes through the first path or the second path during switching.

13 Claims, 9 Drawing Sheets

U.S. PATENT DOCUMENTS

| | | | |
|---|---|---|---|
| 5,926,317 A | 7/1999 | Cushing | 359/588 |
| 5,946,116 A * | 8/1999 | Wu et al. | 359/117 |
| 5,949,801 A | 9/1999 | Tayebati | 372/20 |
| 5,999,322 A | 12/1999 | Cushing | 359/589 |
| 6,011,652 A | 1/2000 | Cushing | 359/589 |
| 6,018,421 A | 1/2000 | Cushing | 359/588 |
| 6,040,944 A | 3/2000 | Pan et al. | 359/590 |
| 6,064,685 A * | 5/2000 | Bissessur et al. | 372/102 |
| 6,075,647 A | 6/2000 | Braun et al. | 359/578 |
| 6,088,166 A | 7/2000 | Lee | 359/654 |
| 6,122,301 A | 9/2000 | Tei | 372/32 |
| 6,166,838 A * | 12/2000 | Liu et al. | 359/128 |
| 6,275,312 B1 * | 8/2001 | Derks et al. | 359/117 |
| 6,292,299 B1 | 9/2001 | Liou | 359/583 |
| 6,320,996 B1 | 11/2001 | Scobey et al. | 385/18 |

* cited by examiner

RECONFIGURABLE, ALL OPTICAL ADD/DROP NODES USING NON-INTERRUPTING SWITCHING APPARATUS AND METHODS

Copending patent application Ser. No. 09/716,882 is incorporated herein by reference. This application claims the benefit of U.S. Provisional Application Ser. No. 60/248,019, filed Nov. 14, 2000.

BACKGROUND OF THE INVENTION

1. Field of the Invention

The present invention relates to reconfigurable optical add/drop nodes which use non-interrupting switching apparatus and methods.

2. Description of the Prior Art

In Wavelength Division Multiplexed (WDM) fiber optics communications, one fiber carries many data streams, each on a separate wavelength signal. In networks using WDM, ideally each node should be able to separate out (drop) any wavelength in use on the fiber and redirect it to a detector or sub-network. At the same time, it is desirable that each node be able to add data to the fiber on any wavelength channel that is currently unused at the node, either because such wavelength is not present at the node, or because it was just dropped at said node.

In addition, if network nodes are able to switch between the state where a given wavelength channel is dropped and the state where it is passed (not dropped) fast enough (in a way that does not interrupt other network traffic while switching), then the network controller can Time-Division Multiplex (TDM) a wavelength to several subscribers. This is highly desirable, since many customers do not want or need the full data rate possible on a single wavelength. A fast enough switching time for this application is on the order of 2 milliseconds.

In today's optical WDM optical networks, nodes are actually implemented in two different ways, neither of which is ideal:

1. Optical→Electronic→Optical (OEO) Conversion: This is the most common (and expensive) method of constructing nodes. All wavelengths coming into the node along the input fiber are demultiplexed into separate channels and detected (i.e., converted to electronic signals). The signals which are not being dropped at the node are used to modulate lasers and the resulting wavelengths are multiplexed back onto the output fiber. The multiplexing/demultiplexing is typically done with either arrays of filters or with diffraction grating techniques.

The advantage of this method is that the node is completely flexible any wavelength can be dropped or added at the node. In addition, signals may be transferred from one wavelength to another.

The disadvantages of this method are:
   a) Expensive hardware components (the detector, electronics, laser, and modulator) are needed for each wavelength on the fiber. This rapidly becomes very expensive as numbers of wavelengths grow.
   b) Much of the hardware (detectors, electronics, and laser modulators) are data-rate dependent: If the network is upgraded from 2.5 Gigabits/sec to 10 Gigabits/sec per wavelength, for example, all electronics at all nodes must also be expensively upgraded.

2. Fixed Optical Add/Drop Filters: There are, at most, two nodes in a WDM network (the terminal nodes) that need to drop all wavelengths on the fiber—all other nodes (intermediate nodes) usually need to drop or add only a few wavelengths. This can be done inexpensively by passing the fiber through several fixed-wavelength optical drop/add filters. Only the wavelengths these filters are designed for are dropped or added—all other wavelengths simply continue on with no change. These filters are usually constructed using thin-film interference filters or fiber Bragg gratings.

Advantages: This node style is considerable less expensive than an OEO node—filters, electronics, and lasers are only required for the number of wavelengths actually to be dropped at the node. If the wavelengths are being sent on to a sub-network, only the inexpensive filters are needed, and the node is data-rate independent.

Disadvantages: Fixed-wavelength nodes don't allow the network to adjust to varying loads, and make network expansion more difficult. When the network grows complicated enough, "wavelength blocking" occurs: even though the network may be far from it's theoretical carrying capacity, certain pathways are blocked from use as no single wavelength can connect them. The network could be manually re-configured to remove any given block, but this would create other blocked paths during different load conditions. This problem grows rapidly with network complexity. In addition, current fixed-drop technologies cannot be switched on and off without interrupting the rest of the network traffic.

Neither of the above methods of constructing optical add/drop network nodes adequately address the need for networks to be both inexpensive and easily and quickly reconfigurable—the OEO nodes achieve wavelength flexibility at the cost of a very high price and data-rate sensitivity; the fixed wavelength add/drop filter nodes are data-rate insensitive and inexpensive, but are completely inflexible as to the dropped wavelengths. The ideal network node would, therefore, have the following characteristics:

I. The node would be all optical—there would be no optical to electronic conversions. Thus the node would be completely insensitive to data-rate upgrades.
II. The node would have the flexibility to drop (and add) any wavelength on the fiber, and the wavelengths to drop could be changed remotely at any time without data interruption to the rest of the network.
III. The node could be constructed relatively inexpensively, using proven components.
IV. The node would have low loss, at least for the passed (undropped) wavelengths, so as to minimize the requirement for expensive optical amplifiers.

Two methods of addressing the need for flexibility in choosing which wavelengths to drop (or add) at an intermediate network node that are being developed are tunable add/drop filters and re-configurable Optical Add/Drop Multiplexers (OADMs).

Tunable Add/Drop Filters: This method uses a tunable optical filter with a relatively broad tuning range, capable of tuning across several WDM channels. FIG. 1 (Prior Art) shows a possible configuration for using a Fiber Bragg Grating (FBG) filter 108 as a tunable OADM. The FBG (which can be tuned either by stretching or heating) is placed between two optical circulators 104, 110. Inputs 102 are $\lambda 1$, $\lambda 2$, $\lambda 3$ in this example. The wavelength 106 that the FBG is currently tuned to (shown as $\lambda 2$ in FIG. 1) is reflected back toward the input, whence it is diverted by the input-side circulator 104 to the drop fiber. The rest of the channels ($\lambda 1$, $\lambda 3$) pass the FBG and go to the Pass-Through output 112 back to the network. To add back to the network, the dropped wavelength 114 (but probably carrying different information—designated as λ2' in FIG. 1), is input to the channel of the output circulator 110 that sends it back to the FBG, whence it is reflected to the Pass-Through output 112 along with the other passed wavelengths. The problem with this technique is that the filter momentarily drops all wavelengths that it tunes through.

For example, if the filter is currently dropping, say λ2, and is commanded to switch to λ7; then all of the intermediate channels, λ3 . . . λ6 are momentarily interrupted as the FBG tunes through them. This is unacceptable behavior for a network component.

Reconfigurable OADMs: A second method of building flexibility in wavelength use at a network node, without incurring the cost of a complete Mux/Demux (OEO) node, is to configure a number of fixed add/drop filters with optical switches such that they can be switched into or out of the data fiber at will. FIG. 2 (Prior Art) shows a typical arrangement of switches 202–205 and OADM filters 206, 208 that can switch any or all of the wavelengths addressed by the filters off of the network fiber onto a drop fiber. Mux 210 provides the Drop output. Demux 212 inserts the Add input.

The OADMs can be any suitable device; e.g., based on FBGs or thin film (TF) filters. The switches themselves can be of two basic kinds:

1. A "make and break" switch which can be as simple as a fiber patch cord moved between different jacks on a panel, or as sophisticated as a micro-mirror switch with active alignment. In any case, the prime characteristic of the switch is that the connection between the input and output is broken momentarily while switching between outlets. As a result, the continuity of the pass-through signals is also momentarily broken while switching.

A "continuous" switch, which gradually transfers light energy from one output to the other while switching. An example of this kind of switch is illustrated by imagining a polarized beam of light passing an adjustable polarization rotator and then encountering a polarizing beam-splitter cube. For one polarization the light will proceed straight through the cube. For the orthogonal polarization, the light will reflect from the cube. These states represent the end states of the switch. While the polarization of the beam is in the process of being rotated, the beam divides at the beamsplitter, with part going straight through and part reflecting. While the switching process is going on, the light is traversing two paths. If these paths are not exactly the same length, there is a possibility that some wavelengths of light will suffer destructive interference and be more or less suppressed during switching. Thus, even though this kind of switch never totally disconnects the through circuit, there is still the possibility that signals will suffer momentary loss through destructive interference.

Thus, a need remains in the art for re-configurable add/drop multiplexers that, both: 1) do not convert the optical signals to electronic signals (with a consequent high cost both in initial hardware and for potential upgrades); and 2) do not interrupt the undropped network traffic while re-configuring.

SUMMARY

A non-interrupting switch for input optical signals according to the present invention comprises a beam displacer for selectively redirecting the input beam between at least a first and a second path, an intercepting element in the first path, and a reflective element in the second path for reflecting the beam. The second path is immediately adjacent to the first path, such that substantially all of the light intercepts either the intercepting element or the reflective element. A transmissive element in one of the paths for transmits at least part of the beam.

In one embodiment, the transmissive element comprises a filter. For example the transmissive element might be a thin-film interference filter (TFF)

As a feature, the filter and the reflective element may be integrally formed.

In another embodiment, the reflective element is oriented at an angle for reflecting intercepted light at an angle from the second path. Either the first path or the second path could include a fiber Bragg grating (FBG) and the other of the first path or the second path includes a fiber having the same optical path length as the FBG. Preferably the FBG and the fiber are physically attached to the substrate.

In another embodiment, switching apparatus for switching an Optical Add-or-Drop or Add/Drop Filter attached to a fiber carrying multiple wavelength input channels between a state wherein it passes all wavelength channels and a state wherein it drops or adds a desired channel, where the switching occurs without any interruption in the other wavelength channels on the fiber includes a beam displacer for selectively redirecting the input channels between at least a first and a second path, a reflective element in the second path for reflecting all the input channels, and a filter element in the first path for selectively transmitting the desired channel. The second path is immediately adjacent to the first path, such that substantially all of the light intercepts either the filter element or the reflective element.

The filter element might comprise a tunable filter, a mirror affixed adjacent to the tunable filter with a fixed angle formed by the plane of the mirror and the plane of the tunable filter of under 180°, and means for rotating the tunable filter and mirror about an axis at the vortex of the plane of the tunable filter and the plane of the mirror.

The filter element might comprises an array of filters and means for moving the array of filters such that a selected filter intercepts the first path.

Another embodiment of a non-interrupting switch for input optical signals according to the present invention comprises a polarization diversity collimator for separating the input signal into parallel beams having the same polarization, a polarization rotator for selectively altering the polarization of the parallel beams according to its rotation, and a polarization beam splitter for dividing the light from the polarization rotator into a first path and a second path according to its polarization.

The first path might include a fiber Bragg grating (FBG) and the second path a fiber having the same optical path length as the FBG. Preferably, the FBG and the fiber are physically attached to a substrate.

BRIEF DESCRIPTION OF THE DRAWINGS

FIG. 9a utilizes FBGs and FIG. 9b utilizes TFFs.

DETAILED DESCRIPTION OF THE PREFERRED EMBODIMENTS

Figure 3:
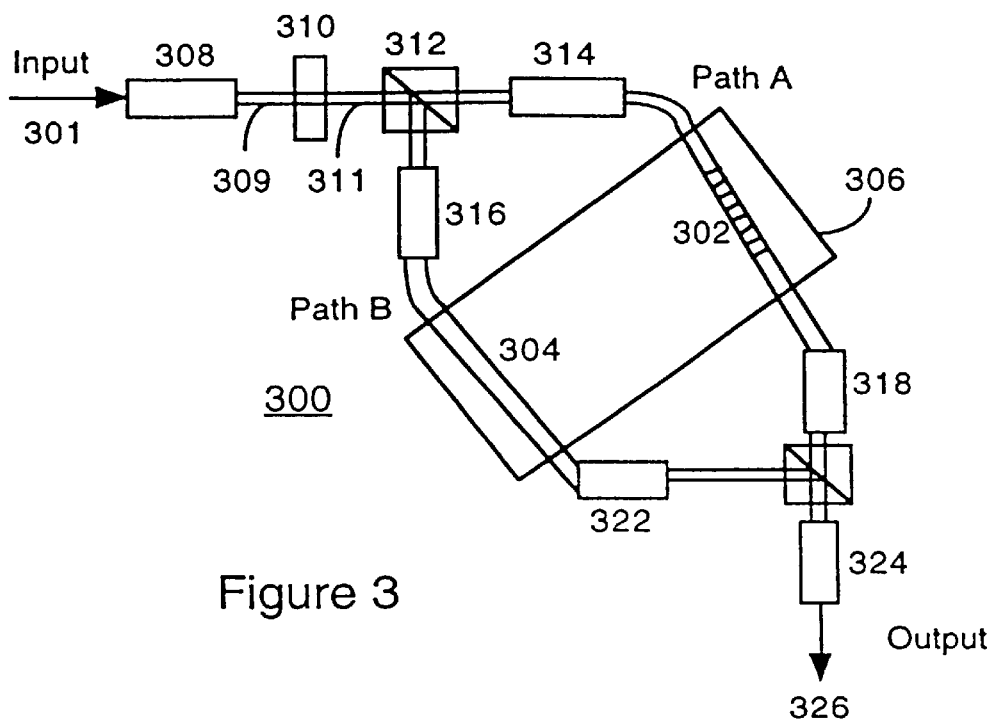
FIG. 3 is a block diagram of a first embodiment of a non-interrupting switch constructed for use with FBGs, according to the present invention.
Figure 4:
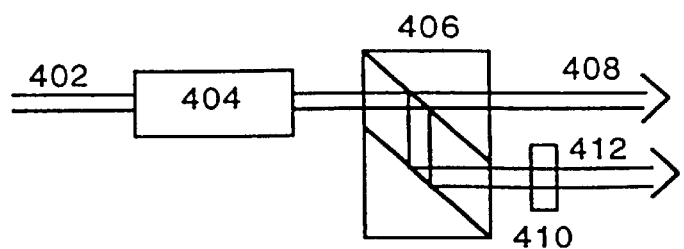
FIG. 4 (Prior Art) is a schematic drawing showing a polarization-diversity collimator (PDC), as known in the prior art and used in some embodiments of this invention.

The present invention relates to apparatus and methods for reconfiguring all-optical OADMs without interrupting network traffic. FIG. 3 is a block diagram of a first embodiment of a non-interrupting switch 300 constructed for use with fiber bragg gratings (FBGs), according to the present invention. Input optical signal 301 feeds a polarization diversity collimator 308. FIG. 4 (Prior Art) shows how conventional polarization diversity collimator (PDC) 308 operates. Briefly, PDC 308 generates two parallel beams having the same polarization.

Polarization rotator (PR) 310 (for example, a half wave plate) operates to alter the polarization of beam 309 according to how PR 310 is rotated. In its unrotated position, PR 310 alters the polarization of resulting beam 311 such that polarization beam splitter 312 passes the signal straight through, and thence along path A. In its rotated position, PR 310 alters the polarization of resulting beam 311 such that polarization beam splitter 312 reflects the signal downward through path B. While PR 310 is being rotated, the polarization of resulting beam 311 gradually shifts, and the amount of light through path A gradually decreases while the amount of light through path B gradually increases.

The signal output from PBS 312 is, of course, still two parallel beams with the same rotation. PDCs 314 and/or 316 reverse the effect of PDC 308, producing recombined, unpolarized light for insertion into path A and/or path B.

PDCs 318, 320, and 324, together with PBS 320, reverse the effects of PDCs 308, 314, and 316 and PBS 320. PDC 318 and/or PDC 320 generate two parallel beams of like polarized light. PBS 324 passes the light from PDC 318 and/or reflects the light from PDC 320 into final PDC 324, which produces recombined, unpolarized light at output 326.

Thus, a polarization-based continuous switching method is used to smoothly change the light path from through tunable FBG 302 in Path A to a parallel fiber 304 of the same length in path B. This smooth transition will not affect any other wavelengths on the fiber unless there is destructive interference between the two paths, which would result in noise affecting other wavelengths. To insure that no destructive interference occurs, the optical path lengths of path A and path B must be identical at all times.

In order to insure that path B with fiber 304 remains the same length as path A with FBG 302 at all times, fiber 304 is physically attached to the same substrate 306 as FBG 302, and undergoes the same physical changes (stretching, compression or temperature change) as FBG 302 when tuning. The unique aspect of the invention in this instance is the arrangement that allows path lengths A and B to always remain equal, hence any interference is always constructive and does not affect network through traffic.

Thus, FBG 302 can be smoothly switched out of the network flow, then tuned, and then switched smoothly back into the network. In this way there is no danger of momentary interruption of network traffic on channels that are tuned through on the way to the desired drop/add channel.

FIG. 4 (prior art) shows the operation of PDCs 308, 314, 316, 318, 320, and 324 in more detail. PDCs are conventional, off the shelf devices. Input signal 402 is unpolarized light. Collimator 404 collimates the light and transmits it to polarizing beam splitter array 406. Polarizing beam splitter array 406 passes one polarization of light straight through as beam 408. The other polarization is reflected downward and then to the right as beam 412. Polarization rotator 410 rotates the polarization of beam 412 such that it now has the same polarization as beam 408. Thus, the PDC acts to turn unpolarized light into two parallel beams of light having the same polarization.

Figure 5A:
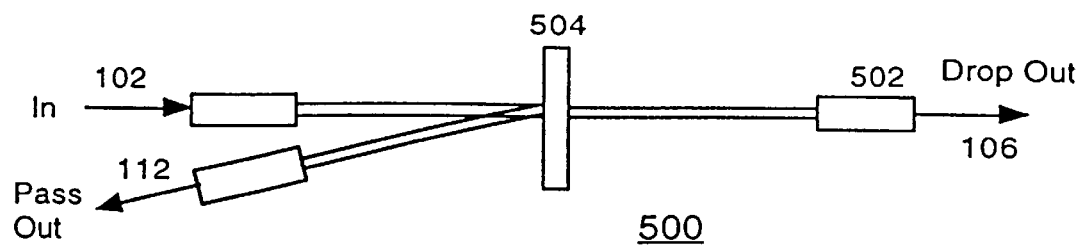
FIGS. 5(a)–5(b) (Prior Art) are block diagrams showing how a thin-film interference filter is used to construct a conventional optical add/drop multiplexer filter (OADM).
Figure 5B:
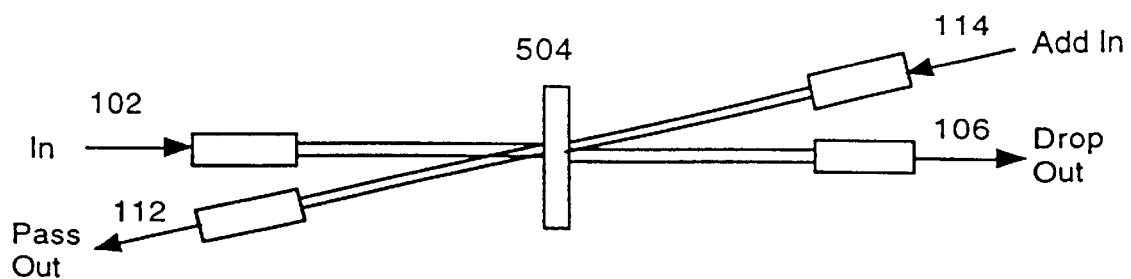

Today, most DWDM systems still use fixed-wavelength thin-film interference filters (TFF) to construct OADMs. The typical layout of a single-channel OADM filter using this technology is shown in FIGS. 5a and 5b (Prior Art). FIG. 5a shows the Add-or-Drop configuration and FIG. 5b show the Add-and-Drop configuration.

In FIG. 5a (Prior Art), interference filter 504 is built to pass frequency λ2 and reflect other frequencies. Thus input frequencies λ1 and λ3 are reflected to pass out port 112. Input frequency λ2 is passed through filter 504 to drop out port 106. Collimators 502 collimate the light. When used as an add filter, drop out port 106 become add in port 114, and frequency λ2 is inserted into port 114, passes through filter 504, and is added to the signals at pass out port 112.

In FIG. 5b (Prior Art), interference filter 504 is again built to pass frequency λ2 and reflect other frequencies. Thus input frequencies λ1 and λ3 are reflected to pass out port 112. Input frequency λ2 is passed through filter 504 to drop out port 106. Add in frequency λ2 (at the same frequency, but different encoded information) is added at add in port 114, passes through filter 504, and is added to the signals at pass out port 112.

Figure 6A:
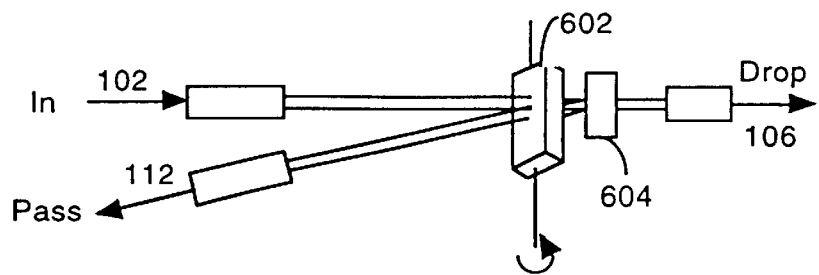
FIG. 6a is a top view schematic drawing illustrating a second embodiment of a non-interrupting switch according to the present invention, utilizing beam displacement and incorporated into a thin-film OADM.
Figure 6B:
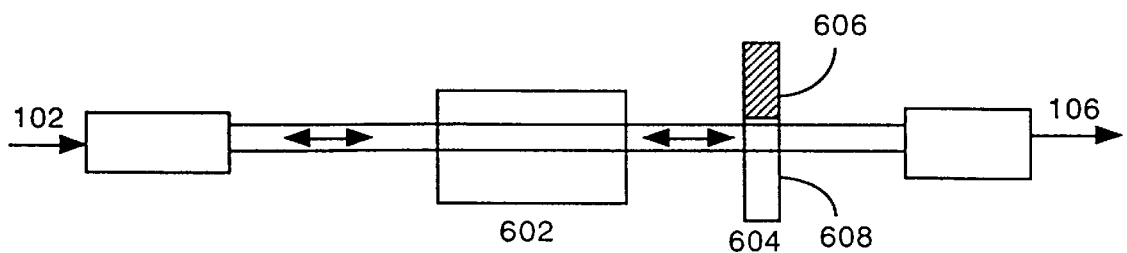
FIG. 6b is a side view schematic drawing of the beam displacement embodiment shown in FIG. 6a, with the beam dropped.
Figure 6C:
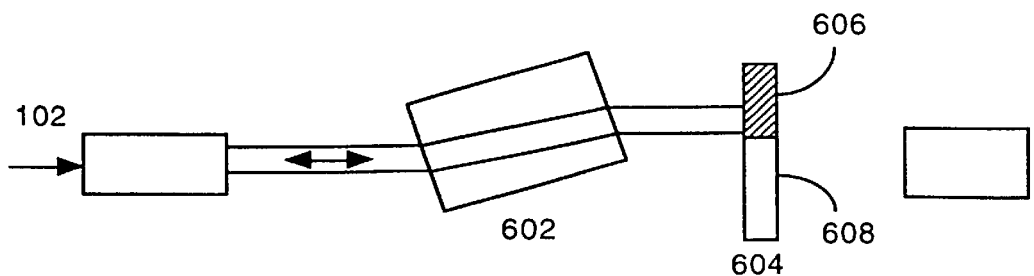
FIG. 6c is a side view schematic drawing of the beam displacement embodiment shown in FIG. 6a, with the beam displaced and thus not dropped.

FIGS. 6a, 6b, and 6c show how the addition of a parallel-plate beam displacer 602 and a simple modification of a portion of the TFF 604 can be used to construct a non-interrupting switchable OADM. The embodiment illustrated in FIGS. 6a–c is an improvement of conventional OADM 500. FIG. 6a is a top view schematic drawing illustrating a second embodiment of a non-interrupting switch according to the present invention, utilizing beam displacement and incorporated into a thin-film OADM. FIG. 6b is a side view schematic drawing of the beam displacement embodiment shown in FIG. 6a, with the beam dropped. FIG. 6c is a side view schematic drawing of the beam displacement embodiment shown in FIG. 6a, with the beam displaced and thus not dropped.

The modification to TFF 604 is that ½ of the surface of TFF 604 is treated so as to form a mirror surface. This is shown in FIGS. 6b and 6c. One possible method of achieving this is to vacuum coat a reflective surface 606 on the desired surface, while leaving the other half of the surface 608 operating as a conventional TFF filter.

In FIG. 6a, parallel-plate beam displacer 602 is in its unrotated position. Input beam 102 thus passes through the conventional half 608 of filter 604 in the normal manner and OADM 600 operates in similar manner to OADM 500 in FIG. 5a.

In FIG. 6c, parallel-plate beam displacer 602 is in its rotated position. Thus, input beam 102 is parallel-displaced so as to intercept the mirrored surface 606. All of the wavelengths in the fiber are reflected on so that the filter has no effect. No wavelengths are dropped; all are passed. Since the reflected light is displaced back to its original position on returning through beam displacer 603, there is no loss of coupling between input fiber 102 and pass-output fiber 112 due to the action of the beam displacer. (There is a slight sideways translation of the return beam due to the fact that the beam displacer is not exactly normal to the beam directions. For typical geometries, such as a 2.50° filter angle, 5 mm beam path, and 0.5 mm diameter beam, this effect is only about 5–7 $\mu$m—not enough to cause noticeable coupling loss).

There are several ways of insuring that system 600 shown in FIGS. 6a, 6b, and 6c does not cause deterioration of the network through traffic while it is switching:

1. Obviously, the path difference between reflecting from filter half 608 and reflecting from mirrored half 606 is extremely small. In some configurations, however, a phase change exists between the two reflections that results in destructive interference while the beam is halfway across. In these cases, mirrored surface 606 is modified with a simple thin film coating that adjusts the phase change on the mirrored reflection to equal that of the filter reflection. An alternative method is to increase the thickness of the mirrored coating so as to bring the two reflections back into phase. Thus, all possible interference for a considerable distance either side of the WDM band will be only constructive, and will not interfere with the Network through traffic.

2. Alternatively (or additionally), the light passing through the filter is converted into two beams of the same polarization, using polarization-diversity collimators as shown in FIG. 4. The two beams are arranged such that they are moved onto the mirrored surface one at a time, and thus any destructive interference can, at most, only affect ½ of the through signal power at a time, thus preventing a substantial signal loss.

Figure 7:
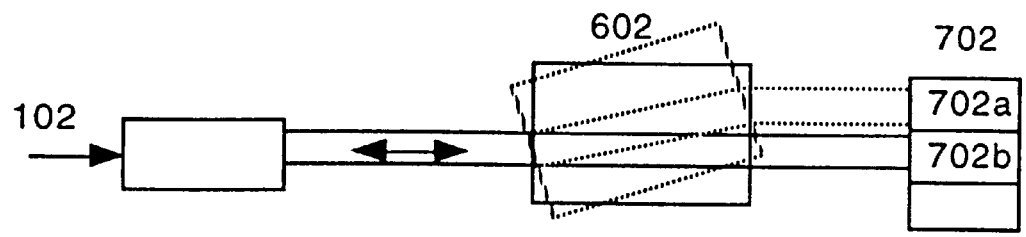
FIG. 7 is a side view schematic drawing showing the switching embodiment of FIG. 6 used in a fiber 1×N switch according to the present invention.

FIG. 7 is a side view schematic drawing showing a switching embodiment similar to that of switch 600 of FIG. 6, used in a fiber 1×n switch 700. FIG. 7 shows how beam displacer 602, can be used as a 1×n or n×1 fiber switch. In its unrotated state, beam displacer 602 transmits input signal 102 to location 702b of array 702. In its rotated state (shown in dotted lines) beam displacer 602 transmits input signal 102 to location 702a of array 702. Switch 700 can also be used as an n×1 switch, by providing inputs from the right and using beam displacer 602 to select one input to transmit.

Since the beam displacements are always strictly parallel as a function of the plane-parallel geometry of the two active faces of displacer block 602, this is a good way of generating a parallel shift with a relatively low-accuracy movement (the rotation of the displacer) while maintaining the extreme pointing accuracy of the beam necessary to maintain good single-mode fiber coupling.

Figure 8:
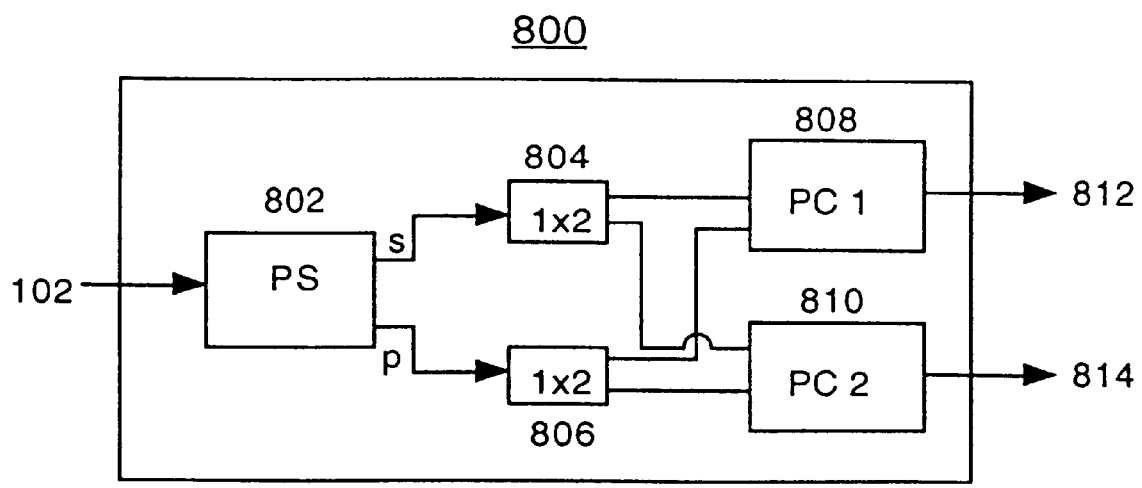
FIG. 8 is a block diagram illustrating a third embodiment of a non-interrupting switch, which restricts any interference to the passed channels to a maximum of ½ of the channel level.

FIG. 8 is a block diagram illustrating a third embodiment of a non-interrupting switch, which restricts any interference to the passed channels to a maximum of ½ of the channel level. FIG. 8 shows how a non-interrupting switch can be constructed using arbitrary switching technology combined with polarization-diversity techniques.

Polarization splitter 802 divides input signal 102 into two parts s and p, derived from the orthogonal polarizations of the input signal (in order to maintain these two portions at approximately equal power, it might be useful to first pass the signal through a polarization scrambler). Signal s passes through switch 804 to either polarization combiner 808 or 810. Signal p passes through switch 806 to either polarization combiner 808 or 810.

The two parts s and p come from orthogonal polarizations in the input fiber, and go to orthogonal polarizations in the output fibers 812 and 814, so they cannot interfere with each other. Signals s and p are switched from one output fiber (e.g. 812) to the other output fiber (814) one at a time. No more than ½ of the signal strength can be lost at any time, regardless of the particular configuration of the internal switches 804 and 806. Thus, any method of polarization splitting 802 and any method of switching 804, 806 known in the art may be used to construct non-interrupting switch 800.

If switches 804, 806 are make and break switches, half of the signal will be lost during switch operation. If switches 804, 806 are continuous switches, than at most half of some wavelengths may be lost during the switch.

Figure 2:
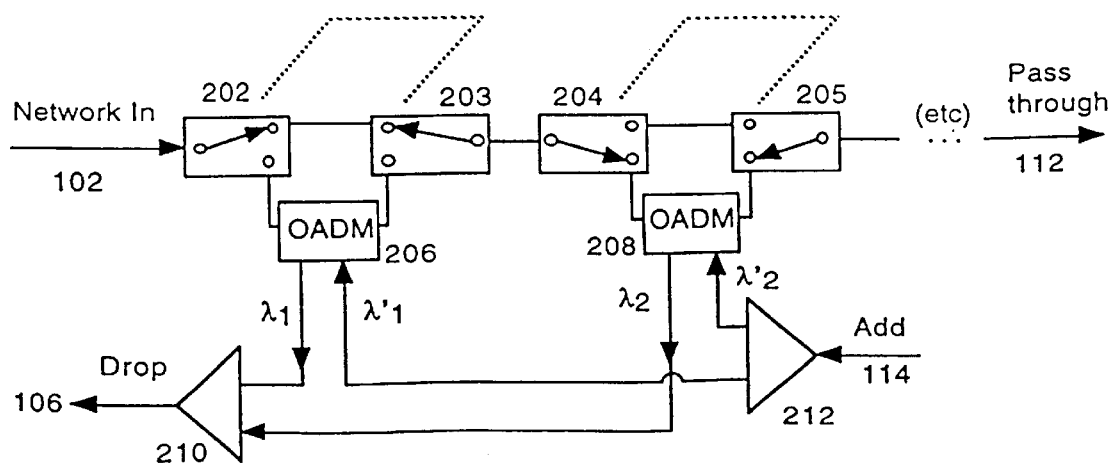
FIG. 2 (Prior Art) is a schematic diagram showing a conventional reconfigurable OADM using Optical Add/Drop Filters and fiber switches.

This composite non-interrupting switch may be used to replace other switches in conventional reconfigurable OADM arrangements (for example, the prior art embodiment shown in FIG. 2) in order to create a non-interrupting reconfigurable OADM. The switch shown in FIG. 12 could also be used.

Figure 9A:
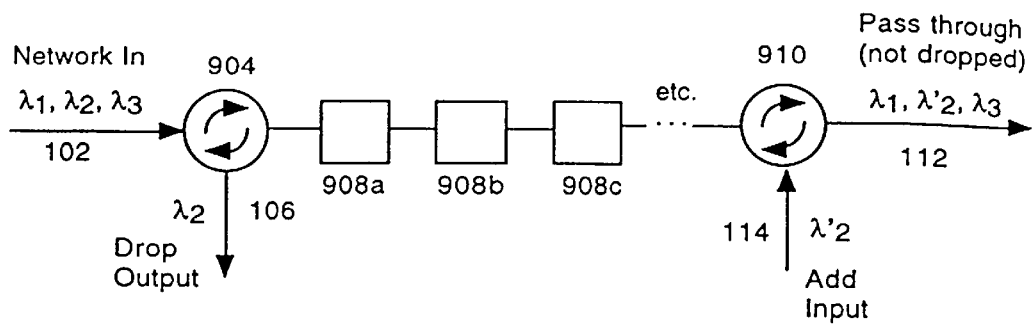
FIGS. 9a and 9b are block diagrams illustrating the use of non-interrupting switchable OADMs according to the present invention combined into reconfigurable optical add/drop multiplexer nodes.
Figure 9B:
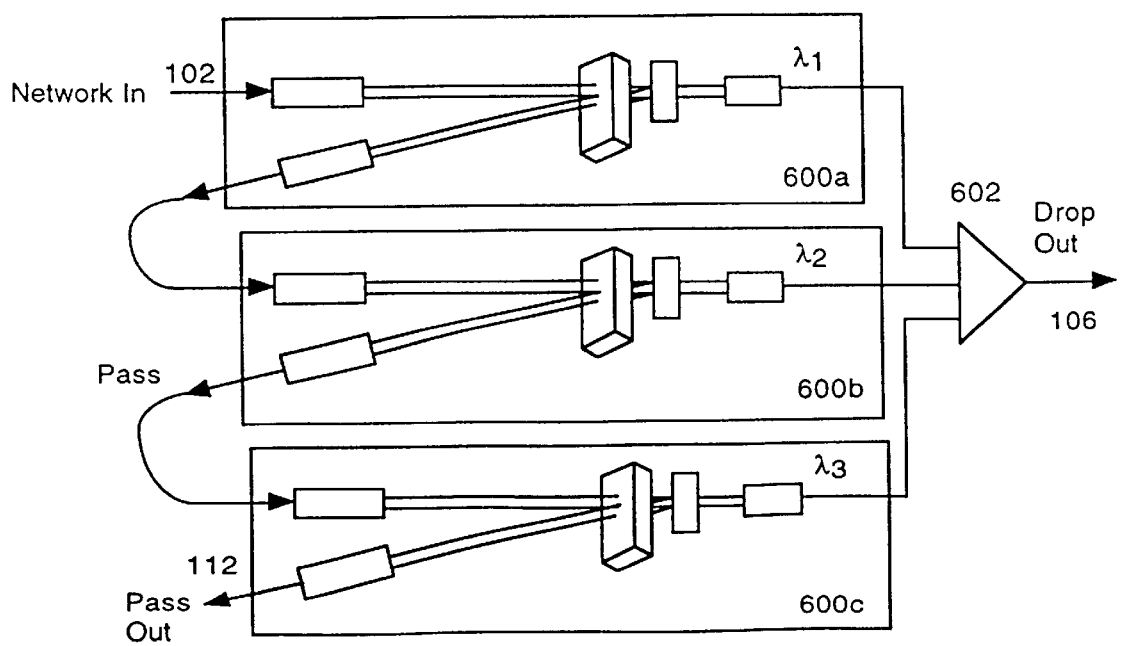

FIGS. 9a and 9b are block diagrams illustrating the use of non-interrupting switchable OADMs according to the present invention combined into reconfigurable optical add/drop multiplexer nodes.

FIG. 9a utilizes FBGs and FIG. 9b utilizes TFFS.

Figure 1:
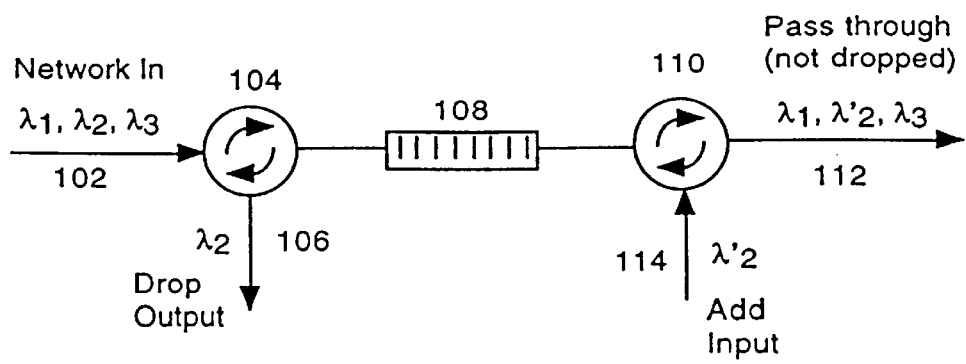
FIG. 1 (Prior Art) is an illustration of a conventional add/drop multiplexing filter using Fiber Bragg Gratings (FBGs). If more than one wavelength is to be dropped simultaneously, then multiple FBGs are placed in series between the two circulators.

FIG. 9a is an improvement on systems like that shown in FIG. 1. Thus the same reference numbers are used for similar elements. As in FIG. 1 (Prior Art), tuning elements 908 are placed between two optical circulators 104, 110. Tuning elements 908 are non-interrupting switches according to the present invention. For example, switches 300 of FIG. 3 might be used.

Input wavelengths from the network are inserted at port 102. The selected dropped wavelength(s) are reflected by elements 908 back toward the input, and diverted by input-side circulator 104 to drop fiber 106. Non-reflected channels pass through elements 908 and on to the pass through output 112 back to the network. To add channel(s) back to the network, the added wavelength(s) are input via add port 114 to output circulator 110, which sends them back to through elements 908, whence they are reflected to pass through output 112 along with the other passed wavelengths.

Those skilled in the art will appreciate that for a given configuration, the same wavelengths (but different signals) will be added and dropped by the system of FIG. 9a, if those wavelengths are input at both ports 102 and 114.

FIG. 9b is an add-or-drop OADM according to the present invention. It utilizes thin film interference filters (TFFs) 600 of FIGS. 6a–6c to accomplish non-interrupting switching. FIG. 9b is an an improvement on systems like that shown in FIG. 5a.

Input wavelengths from the network are inserted at port 102. The selected dropped wavelength(s) are transmitted by respective switch(es) 600 to mux 602, and thence to drop fiber 106. Passed channels are reflected by all switches 600 to the pass through output 112, and back to the network.

Figure 10:
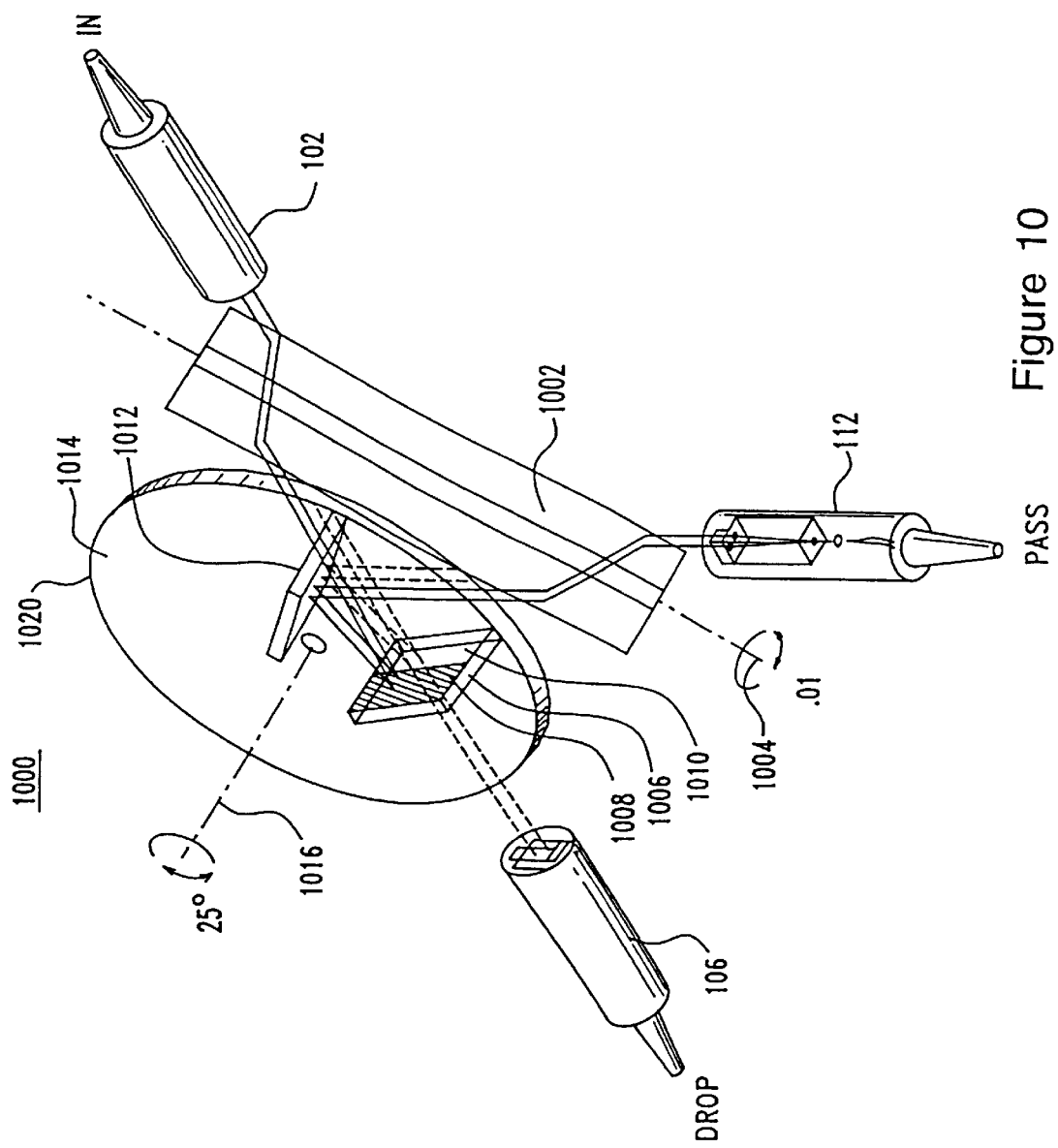
FIG. 10 is a side view isometric drawing of a fourth embodiment of a non-interrupting switch according to the present invention which is tunable.

FIG. 10 is a side view isometric drawing of a fourth embodiment of a non-interrupting switch 1000 which is tunable. Copending patent application Ser. No. 09/716,882 provides background description for tunable add-or-drop and add/drop filters, and is incorporated herein by reference.

Briefly, a tunable drop filter system according to the invention taught in Ser. No. 09/716,882 includes some sort of tunable filter 1006 (thin film birefringent, holographic Bragg grating, beamsplitter, interference thin film) to divide the input beam 102 into a dropped beam 106 and a passed beam 112. A mirror 1012 is placed adjacent to filter 1006, such that their extended planes have a dihedral angle of less than 180°, and input beam 102 is directed at filter 1006 such that the portion of the beam reflecting off filter 1006 also reflects off mirror 1012. The passed beam 112, then, reflects off of filter 1006 and mirror 1012 and is directed to a fixed location, and dropped beam 106 passes through filter 1006. Filter 1006 is tuned by rotating the filter/mirror assembly 1020 around an axis 1016 formed where their extended planes meet.

In the example of FIG. 10, a tunable drop filter system divides input beam 102 into a dropped beam 106 and a passed beam 112.

Filter 1006 is an interference filter. Filter 1006 and mirror 1012 are affixed to a turntable 1014 at an angle under 180° to form reflector assembly 1020. The reflector assembly is rotatable about the vertex of the assembly angle, to tune filter 1006 to the desired drop frequency.

Tunable non-interrupting switch 1000 incorporates the non-interrupting apparatus and methods of the present invention as follows. Parallel-plate beam displacer 1002 in its unrotated position causes input beam 102 to impinge upon filter 1006 in its filtering region 1010. This configuration is indicated by dotted lines in FIG. 10. The frequency at which filter 1006 is tuned (by rotating assembly 1020 about axis 1016) passes through filter 1006 and forms drop signal 106. FIG. 6 shows the operation of beam displacer 1002 in more detail.

Parallel-plate beam displacer 1002 in its rotated position (rotated about axis 1004) causes input beam 102 to impinge upon filter 1006 in its mirroring region 1008. This configuration is indicated by solid lines in FIG. 10. Now, the frequency at which filter 1006 is tuned reflects off mirror portion 1008 and mirror 1012 along with the pass frequencies, and forms part of pass signal 112.

Figures 11A, 11B, 11C:
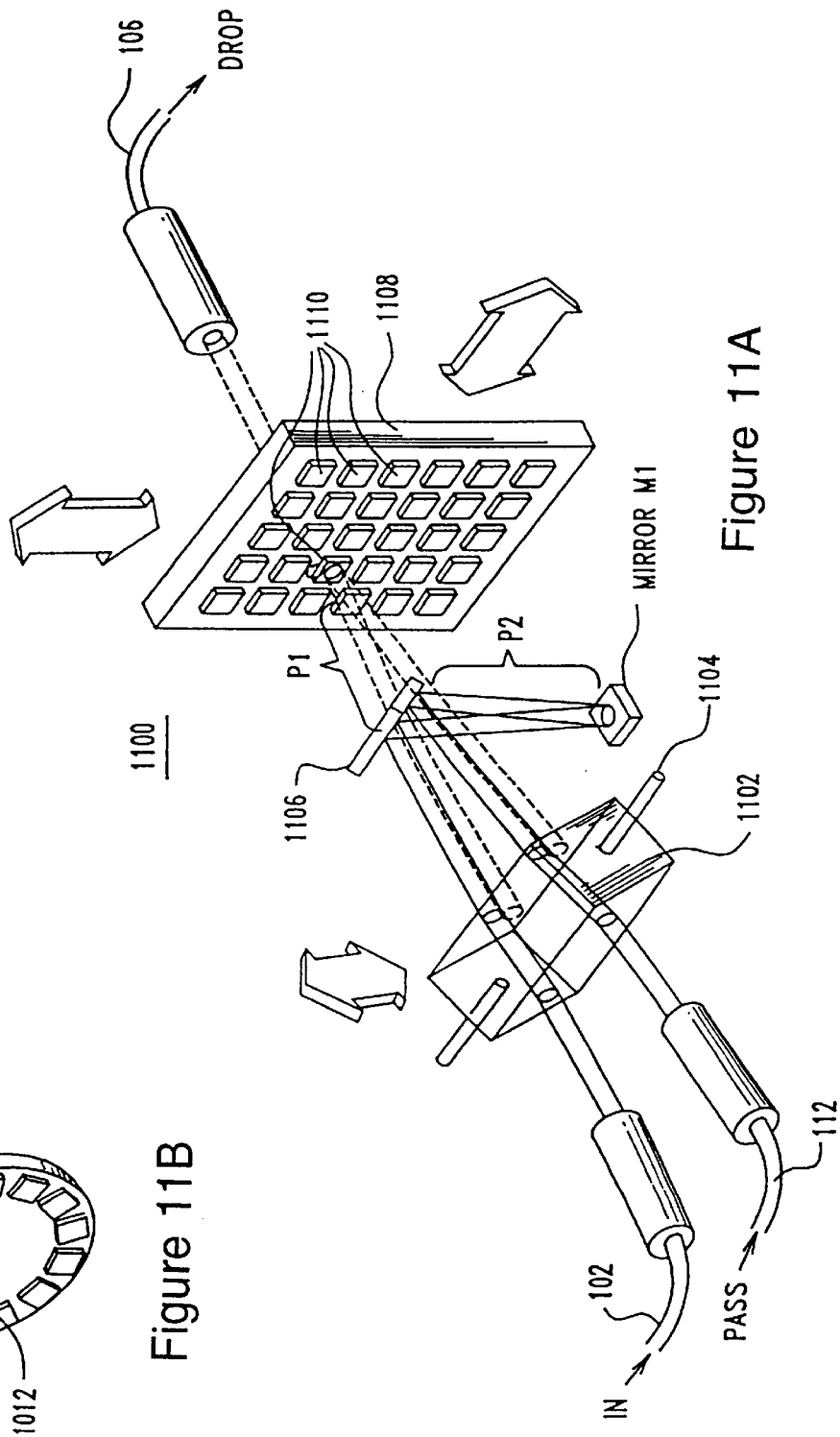
FIG. 11 is a side view isometric drawing of a fifth embodiment of a non-interrupting switch according to the present invention, which is reconfigurable over an array of filters.

FIG. 11 is a side view isometric drawing of a fifth embodiment 1100 of a non-interrupting switch according to the present invention, which is reconfigurable over an array 1108 of filters 1110. Input signal 102 impinges upon Parallel-plate beam displacer 1102. As shown in FIGS. 6 and 10, beam displacer 1102 rotates about axis 1104 to direct input 102 either at mirror 1106 or at a precise point on filter array 1108. When the light is directed to mirror 1106, it is reflected to mirror Ml (see FIG. 11) which reflects it back to output 112. In addition, in the case of switch 1100, filter array 1108 also moves, horizontally and vertically, in order to place a selected filter 1110 at the precise spot where input beam 102 is directed by displacer 1102.

To summarize, displacer 1102 selects either mirror 1106 or filter array 1108 for input 102 (by rotating). Filter array 1108 is translated in order to select which filter impinges the deflected input beam, and therefore is used to select drop and pass frequencies.

This results in a very flexible filter function. First, each filter 1110 in filter array 1108 can select its own set of frequencies to transmit (as drop signal 106) or reflect (as pass signal 112). Second, an array 1108 may be removed and replaced by another array 1108, if the desired filter set changes. Note that optical path lengths P1 and P2 must be equal to avoid destructive interference.

Filter array 1108b illustrates another method for selecting which filter 1110b will be used. Array 1108b is rotated about axis 1012 in order to place a selected filter 1110b in front of the the input beam. Those skilled in the art will appreciate that many methods can be used to place a filter such that it intersect the input signal. For example, array 1108c comprises a linear array of filters 1110c.

Figure 12:
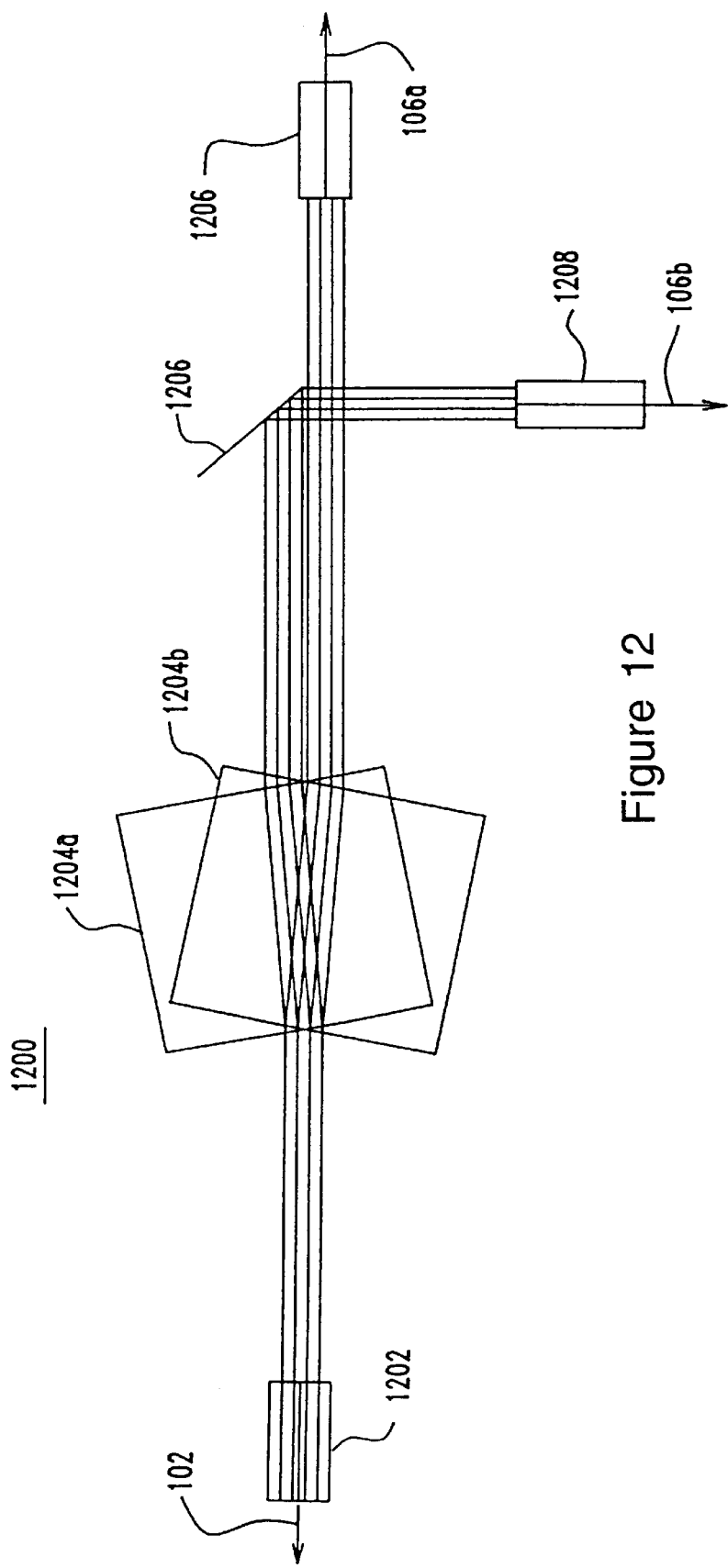
FIG. 12 is a side view isometric drawing of a fifth embodiment of a non-interrupting switch constructed for use with FBGs, according to the present invention.

FIG. 12 is a side view isometric drawing of a fifth embodiment of a non-interrupting switch 1200 constructed for use with FBGs, according to the present invention. The addition of a parallel-plate beam displacer 1204 and mirror 1206 results in a non-interrupting switchable OADM. When parallel-plate beam displacer 1204 is in its unrotated position, 1204b, input beam 102 avoids mirror 1206 and passes through collimator 1206 to form output 106a. When parallel-plate beam displacer 1204 is in its rotated position 1204a, input beam 102 is parallel-displaced so as to intercept mirror 1206. It reflects off mirror 1206 and passes through collimator 1208 to form output 106b.

Those skilled in the art will also appreciate other variations in the present invention that are not specifically shown in a drawing.

What is claimed is:

1. A non-interrupting switch for input optical beams comprising:
   a beam displacer for selectively redirecting the input beam between at least a first and a second path;
   an intercepting element in the first path; and
   a reflective element in the second path for reflecting the beam;
   wherein the second path is immediately adjacent to the first path, such that substantially all of the light intercepts either the intercepting element or the reflective element.

2. The switch of claim 1, further comprising a transmissive element in one of the first path or the second path for transmitting at least part of the beam.

3. The switch of claim 2, wherein the transmissive element comprises a filter.

4. The switch of claim 3, wherein the filter is a thin-film interference filter (TFF).

5. The switch of claim 3, wherein the filter and the reflective element are integrally formed.

6. The switch of claim 1, wherein the reflective element is oriented at an angle for reflecting intercepted light at an angle from the second path.

7. The switch of claim 6, wherein one of either the first path or the second path includes a fiber Bragg grating (FBG) and the other of the first path or the second path includes a fiber having the same optical path length as the FBG.

8. The switch of claim 7, further including a substrate, and wherein the FBG and the fiber are physically attached to the substrate.

9. Switching apparatus for switching an Optical Add-or-Drop or Add/Drop Filter attached to a fiber carrying multiple wavelength input channels between a state wherein it passes all wavelength channels and a state wherein it drops or adds a desired channel, where the switching occurs without any interruption in the other wavelength channels on the fiber, the switching apparatus comprising:

a beam displacer for selectively redirecting the input channels between at least a first and a second path;

a reflective element in the second path for reflecting all the input channels; and a filter element in the first path for selectively transmitting the desired channel;

wherein the second path is immediately adjacent to the first path, such that substantially all of the light intercepts either the filter element or the reflective element.

10. The switching apparatus of claim 9, wherein the filter element comprises:

a tunable filter;

a mirror, the mirror affixed adjacent to the tunable filter with a fixed angle formed by the plane of the mirror and the plane of the tunable filter of under 180°; and means for rotating the tunable filter and mirror about an axis at the vortex of the plane of the tunable filter and the plane of the mirror.

11. The switching apparatus of claim 9, wherein the filter element comprises:

an array of filters; and means for moving the array filters such that a selected filter intercepts the first path.

12. A non-interrupting switch for input optical signals comprising:

a polarization diversity collimator for separating the input signal into parallel beams having the same polarization;

a polarization rotator for selectively altering the polarization of the parallel beams according to its rotation; and a polarization beam splitter for dividing the light from the polarization rotator into a first path and a second path according to its polarization;

wherein the first path includes a fiber Bragg grating (FBG) and the second path includes a fiber having the same optical path length as the FBG.

13. The switch of claim 12, further including a substrate, and wherein the FBG and the fiber are physically attached to the substrate.

* * * * *